(12) United States Patent
Schweinfurth

(10) Patent No.: US 6,838,973 B2
(45) Date of Patent: Jan. 4, 2005

(54) POTENTIOMETER

(75) Inventor: Reiner Schweinfurth, Eppingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/399,661

(22) PCT Filed: Jun. 20, 2002

(86) PCT No.: PCT/DE02/02253

§ 371 (c)(1),
(2), (4) Date: Aug. 27, 2003

(87) PCT Pub. No.: WO03/028046

PCT Pub. Date: Apr. 3, 2003

(65) Prior Publication Data

US 2004/0041687 A1 Mar. 4, 2004

(30) Foreign Application Priority Data

Sep. 4, 2001 (DE) .......................................... 101 43 164

(51) Int. Cl.⁷ .............................................. H01L 1/12
(52) U.S. Cl. ...................... 338/202; 338/176; 338/162
(58) Field of Search ................................ 338/118, 162, 338/176, 202

(56) References Cited

U.S. PATENT DOCUMENTS

| | | | | |
|---|---|---|---|---|
| 2,447,780 A | * | 8/1948 | Underwood et al. | 338/48 |
| 3,328,707 A | * | 6/1967 | Louis et al. | 338/202 |
| 3,353,134 A | | 11/1967 | Elarde | |
| 3,597,720 A | * | 8/1971 | Burgess | 338/202 |
| 3,665,364 A | * | 5/1972 | Maurice | 338/180 |
| 3,733,573 A | * | 5/1973 | Dieterich | 338/202 |
| 3,876,967 A | * | 4/1975 | Hehl et al. | 338/126 |
| 3,936,624 A | * | 2/1976 | Andersen et al. | 200/283 |
| 3,974,471 A | * | 8/1976 | Gilliland | 338/202 |
| 4,751,492 A | * | 6/1988 | Tsuzuki et al. | 338/176 |
| 5,047,746 A | | 9/1991 | Stilwell et al. | |
| 5,321,384 A | * | 6/1994 | Siedle et al. | 338/171 |
| 5,673,015 A | * | 9/1997 | Imamura et al. | 338/176 |
| 5,818,324 A | * | 10/1998 | Richels | 338/162 |
| 5,982,272 A | * | 11/1999 | Masuda | 338/162 |
| 2001/0015689 A1 | | 8/2001 | Doi | |

FOREIGN PATENT DOCUMENTS

| | | |
|---|---|---|
| DE | 39 11 100 A | 10/1990 |
| DE | 196 24 780 A | 1/1998 |
| JP | 1-157502 * 6/1989 | .................. 338/202 |

* cited by examiner

Primary Examiner—Karl D. Easthom
(74) Attorney, Agent, or Firm—Ronald E. Greigg

(57) ABSTRACT

A potentiometer, used in particular as a position sensor or position transducer is disclosed, which has at least one wiper path and one wiper that has at least one contact element (19), resting with a contact face (20) on the wiper path and electrically contacting the wiper path; the wiper and the wiper path are movable toward one another. To reduce costs by reducing the amount of noble metal used for the contacting in the potentiometer, the contact element (19) has an electrically conductive core (21) and a noble metal jacket (22), surrounding the core (21), whose annular end face at least partly forms the contact face (20) (FIG. 4).

19 Claims, 2 Drawing Sheets

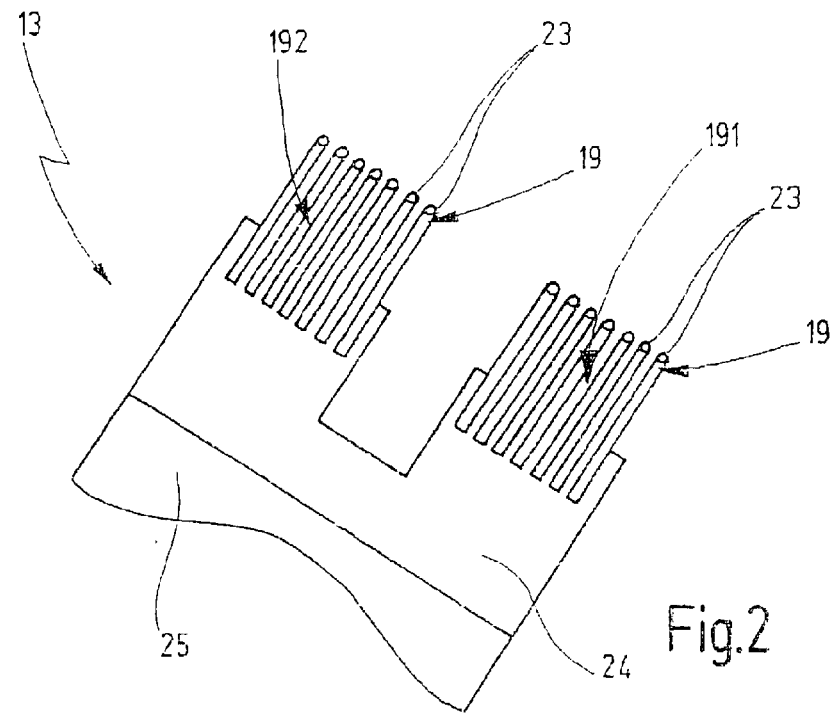
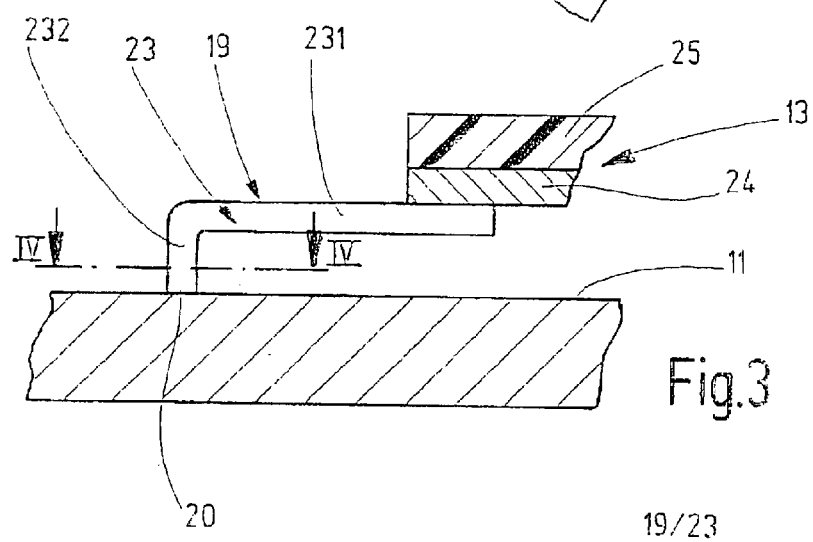
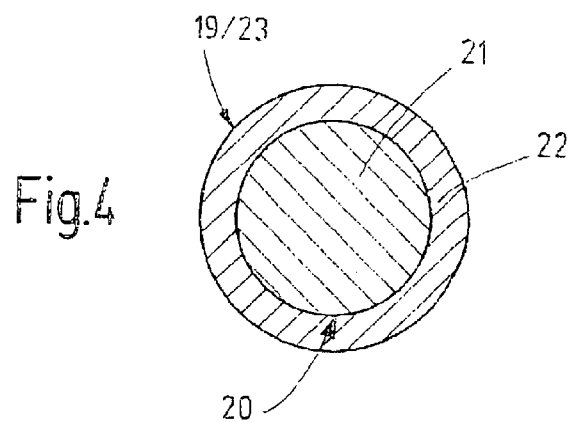

POTENTIOMETER

CROSS-REFERENCE TO RELATED APPLICATIONS

This application is a 35 USC 371 application of PCT/DE 02/02253 filed on Jun. 20, 2002.

BACKGROUND OF THE INVENTION

1. Field of the Invention

The invention relates to an improved potentiometer, and more particularly to an improved potentiometer used as a position sensor.

2. Description of the Prior Art

In one known potentiometer (German Patent Disclosure DE 196 24 780 A1), which is used as a position sensor for detecting the angular position of a throttle valve in the intake tube of an internal combustion engine, the wiper has a substrate, and two resilient wiper chips secured to it, which on their ends each carry a contact brush, and these brushes in turn make the electrical contact with a wiper path of resistor material. Of the two concentrically disposed wiper paths, one is connected at its ends to two connection terminals for applying a potentiometer voltage, and the other wiper path is connected by one end to a measuring terminal, at which a potentiometer voltage picked up by the wipers can be picked up as a measure of the relative position of the wiper and the wiper path. Since the wiper path is fixed in a housing of a throttle valve neck, and the wiper is connected to the adjusting shaft for the throttle valve in a manner fixed against relative rotation, the voltage picked up at the measuring terminal is a measure for the rotary position of the throttle valve.

SUMMARY OF THE INVENTION

The potentiometer of the invention has the advantage that because of the inventive layout of the contact element that electrically contacts the wiper path, that is, comprising an electrically conductive core and a noble metal jacket, the typically high proportion of noble metal used for the electrical contacting is reduced, resulting in a cost saving. The annular face of the noble metal jacket assures that noble metal that assures good contacting rests on the wiper path, as it always did.

By the provisions recited in the other claims, advantageous refinements of and improvements to the potentiometer defined by claim 1 are possible.

In a preferred embodiment of the invention, the contact element is embodied as a wiper wire, which is secured on its end facing away from the contact face to a wiper arm of the wiper. This has the advantage that by means of the noble metal jacket that is present over the length of the wiper wire, reliable contacting with low transfer resistance can be made on the substrate side as well.

In an advantageous embodiment of the invention, the wiper wire is bent at an angle such that the longer leg is secured to the substrate, and the shorter leg has the contact face. This has the advantage that by means of the long leg of the angled wiper wire, a contact pressure acting on the contact face is brought to bear by the wire itself and assures the electrical contacting to the wiper path. This is especially true whenever in a further feature of the invention the core of the wiper wire is made from spring wire, so that a resilient prestressing can be impressed upon the wiper wire.

BRIEF DESCRIPTION OF THE DRAWINGS

The invention is explained in further detail in the ensuing description, taken in conjunction with the drawings, in which:

FIG. 2, a fragmentary view from below of the wiper of the potentiometer of FIG. 1;

FIG. 3, a fragmentary section taken along the line III-III in FIG. 1; and

FIG. 4, a section through a wiper wire of the wiper of the potentiometer taken along the line IV-IV in FIG. 3.

DESCRIPTION OF THE PREFERRED EMBODIMENT

Figure 1:
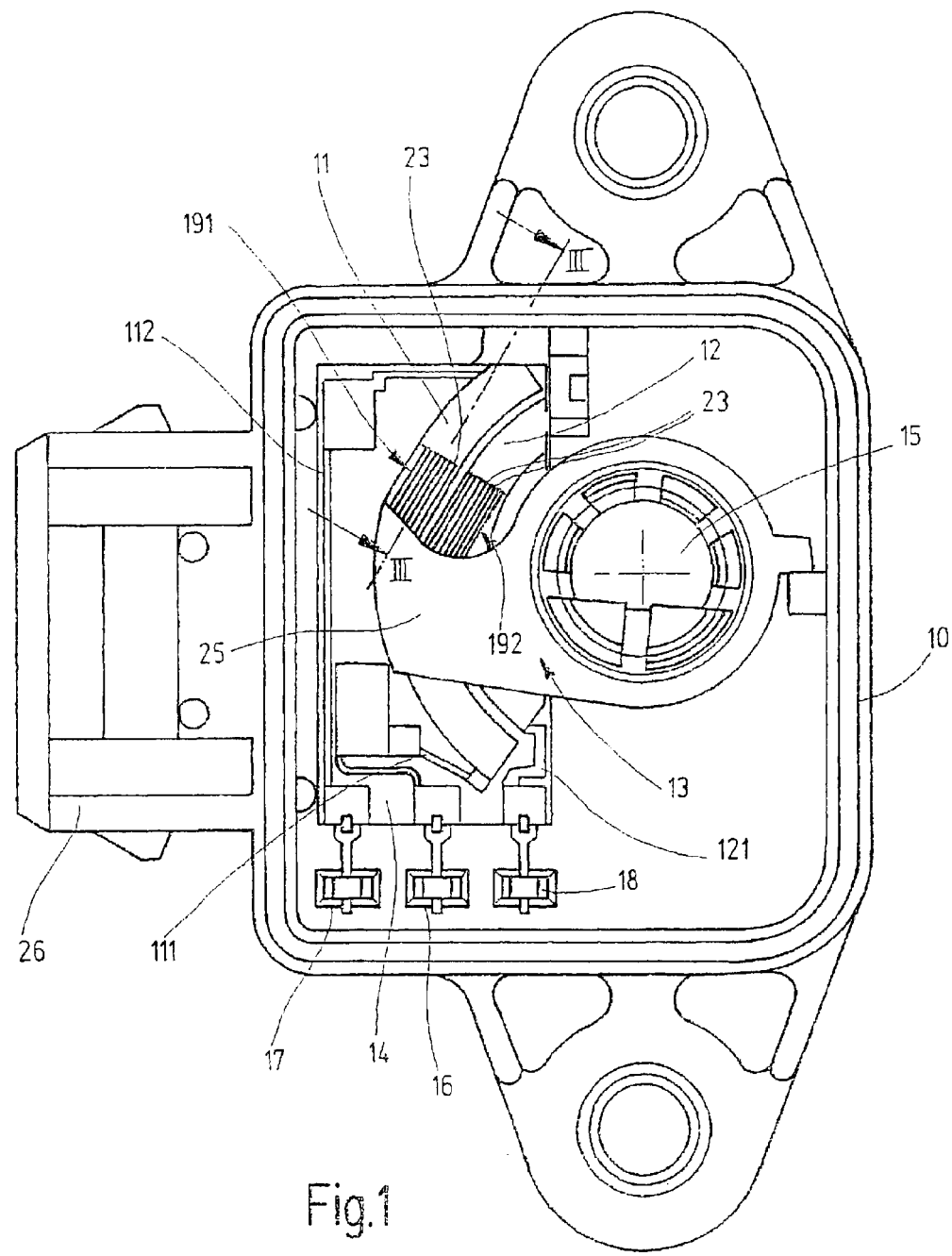
FIG. 1 is a potentiometer according to the invention, used as a position sensor or rotary angle encoder for detecting the rotary angle position of a rotating component.

The potentiometer shown in the drawing serves as a position sensor for sensing the rotary position of a rotating component. In motor vehicles, such a position sensor is used to detect the pivot angle of a throttle valve, which represents the rotating component, that is disposed in an intake conduit of the internal combustion engine. A housing 10 that holds the potentiometer is secured to the so-called throttle valve neck of the intake conduit, and the drive shaft for the throttle valve is coupled with the potentiometer.

The potentiometer has two wiper paths 11, 12, at least one of which comprises electrical resistor material, and one wiper 13, which is rotatable relative to the wiper paths 11, 12. The two wiper paths 11, 12 are embodied as curved segments, which are applied concentrically to one another to a base plate 14, which in turn is received fixedly in the housing 10. The wiper 13 is seated on a rotating shaft 15, which is supported in the housing 10 and, in the case where the potentiometer is used as a position sensor for detecting the pivot angle of a throttle valve, is connected to the adjusting shaft of the throttle valve in a manner fixed against relative rotation, or is formed by the adjusting shaft of the throttle valve. The wiper path 11 is connected by its front and rear ends via respective conductor tracks 111, 112 to a respective connection terminal 16, 17, while the wiper path 12 is connected only by its front end, via a conductor track 121, to a connection terminal 18. The connection terminals 16–18 are extended to plug prongs, not shown here, in a plug housing 26. The plug prongs are occupied in such a way that a potentiometer voltage is applied to the connection terminals 16 and 17, and the voltage picked up at the potentiometer, which is a measure for the rotary position of the wiper 13, or of the component such as the throttle valve that is connected to it in a manner fixed against relative rotation, is picked up at the connection terminal 18.

The wiper 13 has a plurality of contact elements 19, which rest with a contact face 20 (FIG. 4) on the wiper paths 11, 12. The many contact elements 19 are divided into two groups 191 and 192, of which the contact elements 19 of group 191 rest with their contact faces 20 on the wiper path 11, and the contact elements 19 of group 192 rest with their contact faces 20 on the wiper path 12, each with a certain contact pressure. All the contact elements 19 are electrically connected to one another on their end facing away from the contact faces 20. As FIG. 4 shows, each contact element 19, at least in the region of its contact face 20 or in other words on its end resting on the respective wiper path 11 or 12, has an electrically conductive core 21 of an inexpensive filler such as graphite, carbon fiber and the like, as well as a noble metal jacket 22 surrounding the core 21. The core 21 and the noble metal jacket 22 are embodied as flush at their face ends, so that the annular end face of the noble metal jacket 22, together with the end face of the core 21, forms the contact face 20.

In the exemplary embodiment described, each contact element 19 is embodied as a long wiper wire 23, which on its end remote from the contact face 20 is secured to an electrically conductive substrate plate 24, such as a sheet-metal substrate. This securing is preferable done by welding the wiper wire end onto the substrate plate 24. Either the substrate plate 24 is secured to the underside of a plastic wiper arm 25, or it forms the wiper arm 25 itself, and the wiper arm is then connected to the rotating shaft 15 in a manner fixed against relative rotation via a plastic bush. As FIG. 3 shows, each wiper wire 23 is bent at an angle and has one long leg 231, which is secured at its end to the substrate plate 24, and one short 232, which projects from it at a right angle and which has the contact face 20 on its face end. To attain a contact pressure for the contact face 20 on the respective wiper path 11 and 12, the core 21 of the wiper wire 23 is preferably made from spring steel, which is enclosed over the entire length of the wiper wire by the noble metal jacket 22. By means of a suitable prestressing of the now resilient wiper wire, the desired contact pressure of the contact face 20 onto the wiper paths 11, 12 can be adjusted. Each of the many wiper wires 23, which—as described—in group 191 contact the wiper path 11 and in group 192 contact the wiper path 12, has an outside diameter of approximately 0.1 mm.

The invention is not limited to the exemplary embodiment described above. For the function of the potentiometer, only a single wiper path to which a potentiometer voltage is applied also suffices. The measuring voltage is picked up in that case at the wiper 13, which is embodied with a suitable electrical terminal. The relative motion between the wiper 13 and the wiper paths 11, 12 also need not be a rotary motion but instead can be embodied as a linear displacement. Instead of the wiper 13 being movable, the base plate that carries the wiper paths 11, 12 can also be rotated or displaced linearly, in which case the wiper 13 is then fixed in space.

The foregoing relates to preferred exemplary embodiments of the invention, it being understood that other variants and embodiments thereof are possible within the spirit and scope of the invention, the latter being defined by the appended claims.

I claim:

1. A potentiometer, comprising
   at least one wiper path (11, 12)
   one wiper (13) having at least one contact element (19) resting with a contact face (20) on the at least one wiper path (11, 12) and electrically contacting the at least one wiper path (11, 12),
   the wiper (13) being disposed such that the wiper path (11, 12) and the wiper (13) are movable relative to one another,
   the contact element (19), at least in the region of its contact face (20), having an electrically conductive core (21) and a noble metal jacket (22) surrounding the core (21), the core (21) and the noble metal jacket (22) being substantially flush at their face ends, so that the end face of the noble metal jacket (22), together with the end face of the core (21) forms the contact face (20).

2. The potentiometer of claim 1 wherein the core (21) comprises a filler of conductive material selected from the group consisting of graphite and carbon fiber.

3. The potentiometer of claim 1 wherein the contact element (19) is embodied as a wiper wire (23), which with its wiper wire end facing away from the contact face (20) is secured to a wiper arm (25).

4. The potentiometer of claim 2 wherein the contact element (19) is embodied as a wiper wire (23), which with its wiper wire end facing away from the contact face (20) is secured to a wiper arm (25).

5. The potentiometer of claim 3 wherein the wiper wire (23) is bent at an angle and has one long leg (231) secured to the wiper arm (25), and one short leg (232) projecting from the long leg (231) that has the contact face (20).

6. The potentiometer of claim 4 wherein the wiper wire (23) is bent at an angle and has one long leg (231) secured to the wiper arm (25), and one short leg (232) projecting from the long leg (231) that has the contact face (20).

7. The potentiometer of claim 3 wherein the core (21) penetrating the wiper wire (23) is made from spring steel.

8. The potentiometer of claim 5 wherein the core (21) penetrating the wiper wire (23) is made from spring steel.

9. The potentiometer of claim 3 wherein plurality of parallel wiper wires (23) are secured to the wiper arm (25), and wherein one group (191, 192) of wiper wires (23) is associated with the at least one wiper path (11, 12).

10. The potentiometer of claim 5 wherein plurality of parallel wiper wires (23) are secured to the wiper arm (25), and wherein one group (191, 192) of wiper wires (23) is associated with the at least one wiper path (11, 12).

11. The potentiometer of claim 7 wherein plurality of parallel wiper wires (23) are secured to the wiper arm (25), and wherein one group (191, 192) of wiper wires (23) is associated with the at least one wiper path (11, 12).

12. The potentiometer of claim 9 further comprising at least two wiper paths (11, 12) and at least two groups (191, 192) of wiper wires (23) are provided, of which each group (191, 192) contacts a respective wiper path (11 and 12, respectively).

13. The potentiometer of claim 12 further comprising an electrical connection between the wiper wires (23) and the groups (191, 192) of wiper wires is made at the wiper arm (25).

14. The potentiometer of claim 3 wherein the wiper arm (25) comprises an electrically conductive substrate plate (24), and wherein the securing of the wiper wires (23) to the substrate plate (24) is done by welding.

15. The potentiometer of claim 3 wherein the wiper arm (25) comprises an electrically conductive substrate plate (24), and wherein the securing of the wiper wires (23) to the substrate plate (24) is done by welding.

16. The potentiometer of claim 5 wherein the wiper arm (25) comprises an electrically conductive substrate plate (24), and wherein the securing of the wiper wires (23) to the substrate plate (24) is done by welding.

17. The potentiometer of claim 7 wherein the wiper arm (25) comprises an electrically conductive substrate plate (24), and wherein the securing of the wiper wires (23) to the substrate plate (24) is done by welding.

18. The potentiometer of claim 3 wherein the wiper wires (23) have an outside diameter of approximately 0.1 mm.

19. The potentiometer of claim 1 used as a position sensor that detects the relative position of two components movable counter to one another.

* * * * *